US012679748B2

(12) United States Patent (10) Patent No.: US 12,679,748 B2

Baudin et al. (45) Date of Patent: Jul. 14, 2026

(54) WATER TREATMENT METHOD WITH RENEWAL OF THE ADSORBENT TO A TARGETED INTERMEDIATE AGE

(71) Applicant: SUEZ INTERNATIONAL, Paris (FR)

(72) Inventors: Isabelle Baudin, Nanterre (FR); Olivier Danel, Le Vésinet (FR); Bastien Jovanovic, Paris (FR)

(73) Assignee: SUEZ INTERNATIONAL, Paris (FR)

( * ) Notice: Subject to any disclaimer, the term of this patent is extended or adjusted under 35 U.S.C. 154(b) by 590 days.

(21) Appl. No.: 18/026,288

(22) PCT Filed: Sep. 16, 2021

(86) PCT No.: PCT/EP2021/075522

§ 371 (c)(1),
(2) Date: Mar. 14, 2023

(87) PCT Pub. No.: WO2022/058444

PCT Pub. Date: Mar. 24, 2022

(65) Prior Publication Data

US 2023/0357053 A1 Nov. 9, 2023

(30) Foreign Application Priority Data

Sep. 17, 2020 (FR) .................................. FR2009445

(51) Int. Cl.
*C02F 1/28* (2023.01)
*B01J 20/20* (2006.01)
(Continued)

(52) U.S. Cl.
CPC ............... *C02F 1/283* (2013.01); *B01J 20/20* (2013.01); *B01J 20/3416* (2013.01);
(Continued)

(58) Field of Classification Search
None
See application file for complete search history.

(56) References Cited

U.S. PATENT DOCUMENTS

| | | | |
|---|---|---|---|
| 3,855,123 A | 12/1974 | Strudgeon et al. | |
| 2013/0175220 A1* | 7/2013 | Hristovski | B82Y 30/00 |
| | | | 210/683 |
| 2021/0206661 A1 | 7/2021 | Gaid | |

FOREIGN PATENT DOCUMENTS

| | | |
|---|---|---|
| CH | 547116 A | 3/1974 |
| FR | 3003477 A1 | 9/2014 |

(Continued)

OTHER PUBLICATIONS

International Search Report of the International Searching Authority, issued in PCT/EP2021/075522, mailed Dec. 1, 2021; ISA/EP.

(Continued)

*Primary Examiner* — Richard C Gurtowski

(74) *Attorney, Agent, or Firm* — Harness, Dickey & Pierce, PLC

(57) ABSTRACT

A method for treating fluid, notably water, includes a renewal step in order to recover the adsorption capacities of an adsorbent bed, including the extraction of a sample of adsorbent from the adsorbent bed, the determination of a target mean age of the extracted adsorbent sample, in particular by the rejuvenation of at least one portion of the extracted adsorbent sample, at which target mean age the extracted adsorbent has a real abatement of pollutants corresponding to a previously set abatement objective, the rejuvenation of the adsorbent bed to the predetermined target mean age. The method makes it possible to improve the treatment of a fluid by adsorption, and notably to take into account the new contaminants. The disclosure also relates to a plant for treatment according to the proposed method.

20 Claims, 6 Drawing Sheets

(51) Int. Cl.
| | |
|---|---|
| *B01J 20/34* | (2006.01) |
| *C02F 1/00* | (2023.01) |
| *C02F 101/30* | (2006.01) |
| *C02F 103/00* | (2006.01) |
| *C02F 103/06* | (2006.01) |

(52) U.S. Cl.
CPC .......... *C02F 1/008* (2013.01); *C02F 2101/30* (2013.01); *C02F 2103/007* (2013.01); *C02F 2103/06* (2013.01); *C02F 2303/16* (2013.01)

(56) References Cited

FOREIGN PATENT DOCUMENTS

| | | | |
|---|---|---|---|
| JP | H05293461 | A | 11/1993 |
| JP | H06254579 | A | 9/1994 |
| JP | 2019136640 | A | 8/2019 |
| WO | 2019/224258 | A1 | 11/2019 |

OTHER PUBLICATIONS

Japanese Patent Office—Office Action in corresponding Patent Application No. 2023-517337 (Apr. 7, 2025).

* cited by examiner

[Fig. 1]
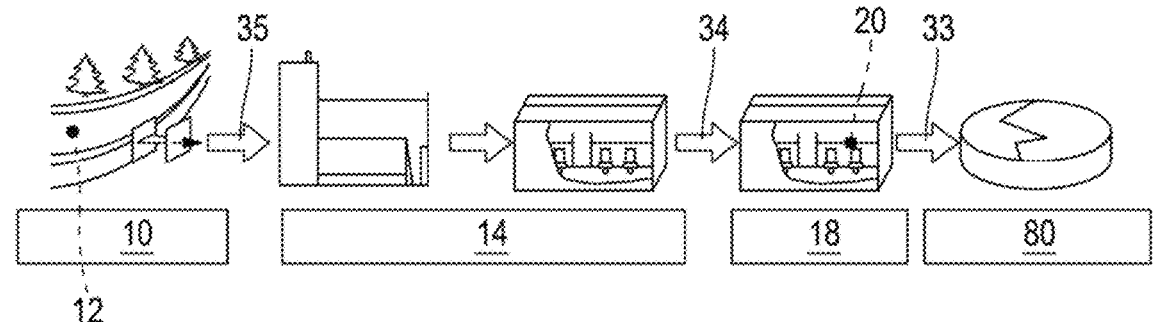
[Fig. 2]
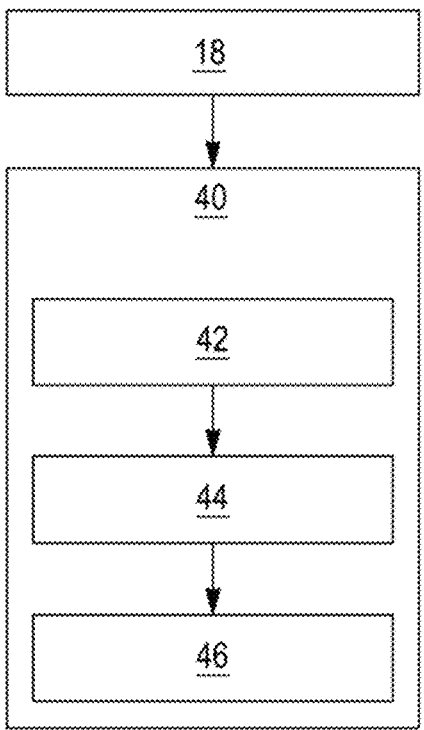

[Fig. 3]
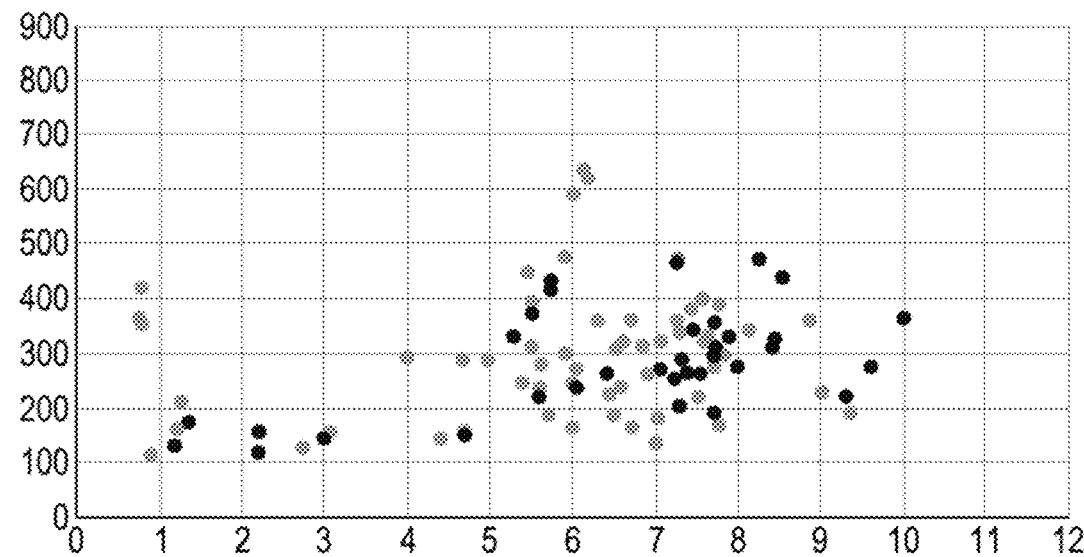
[Fig. 4]
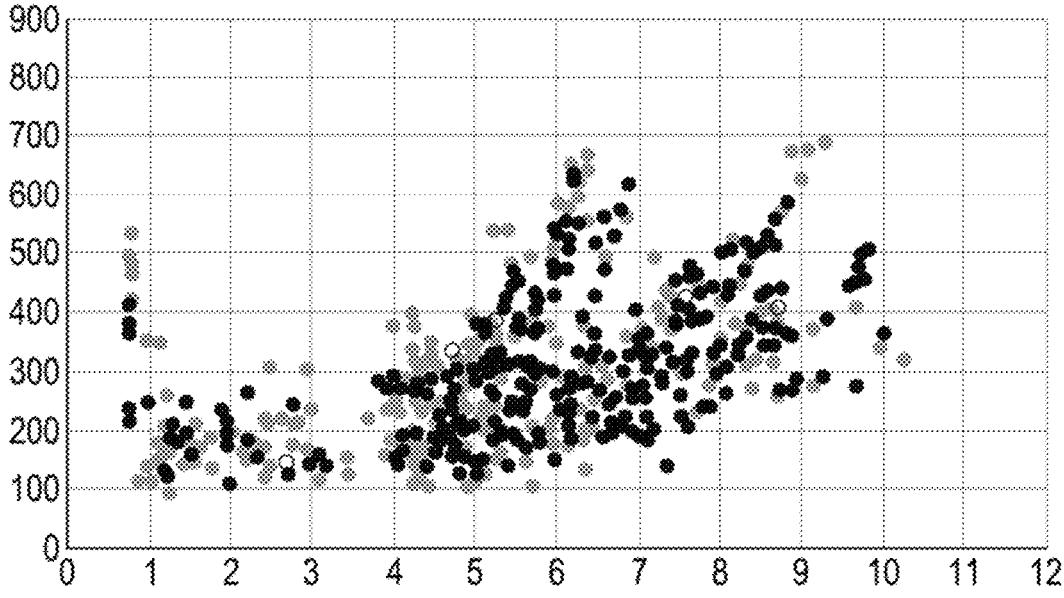

[Fig. 5]
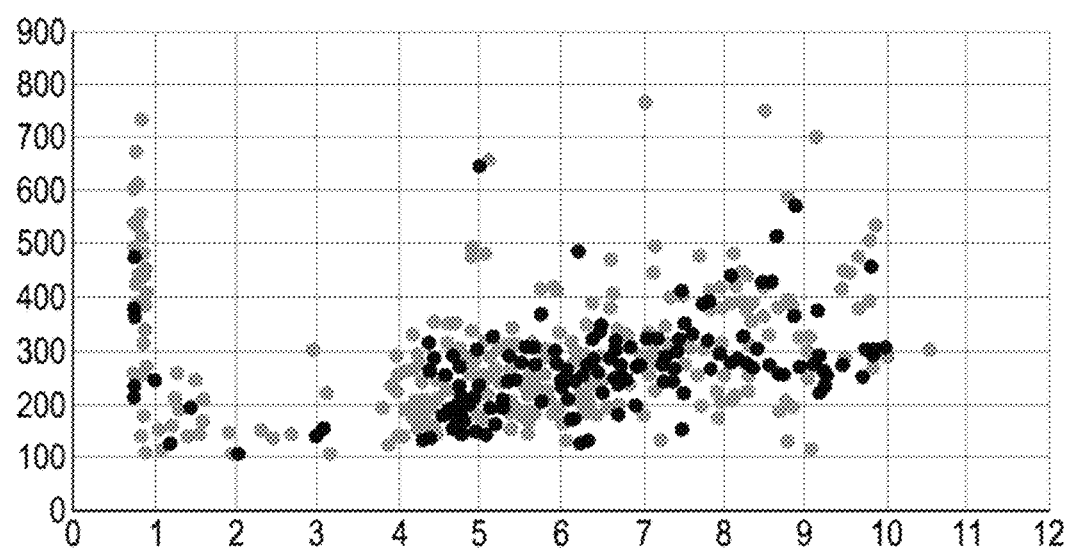
[Fig. 6]
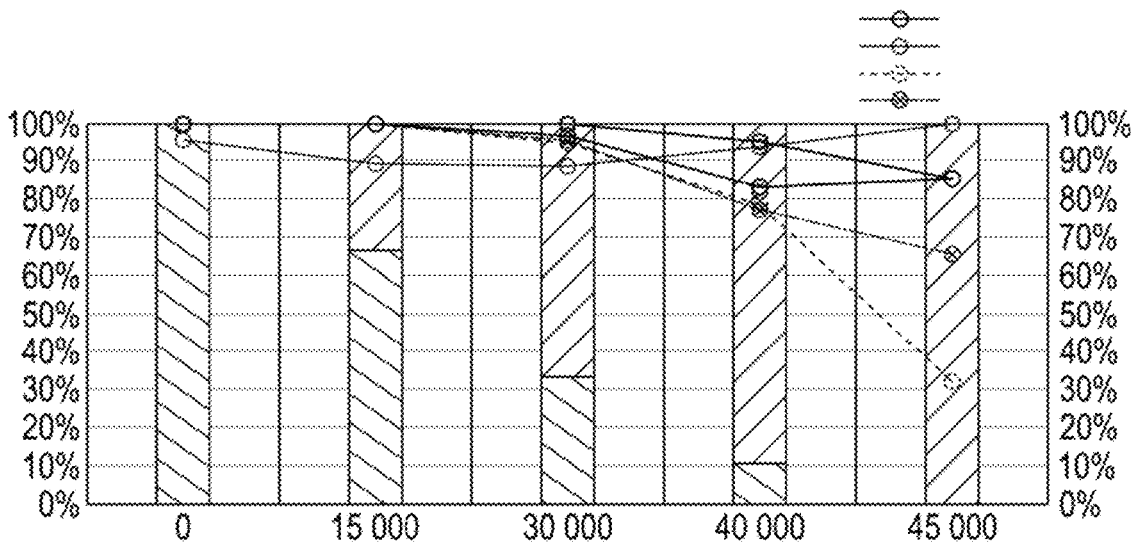

[Fig. 7]
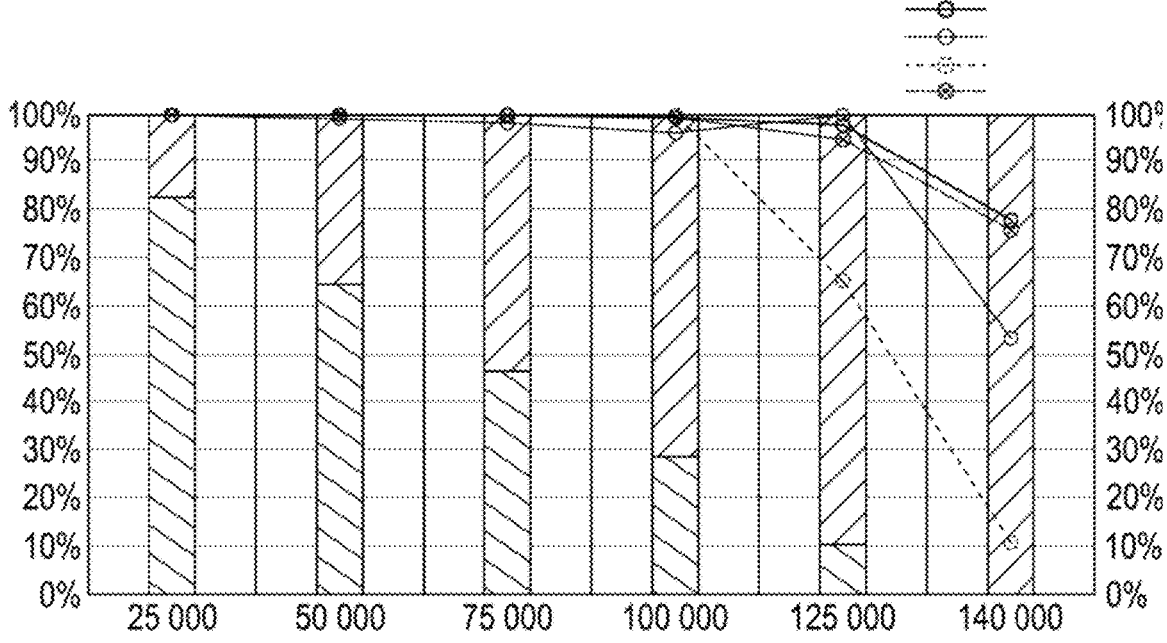
[Fig. 8]
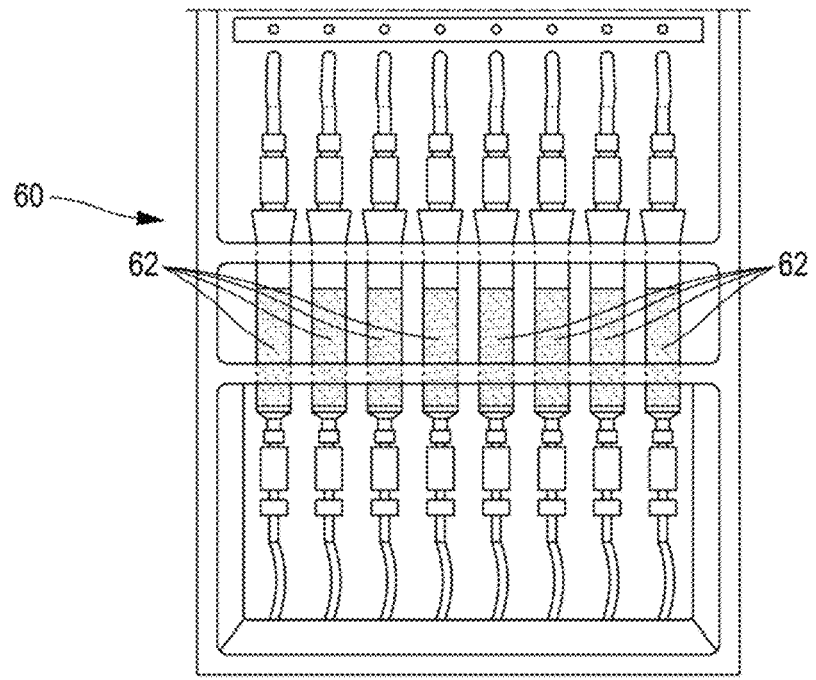

[Fig. 9]
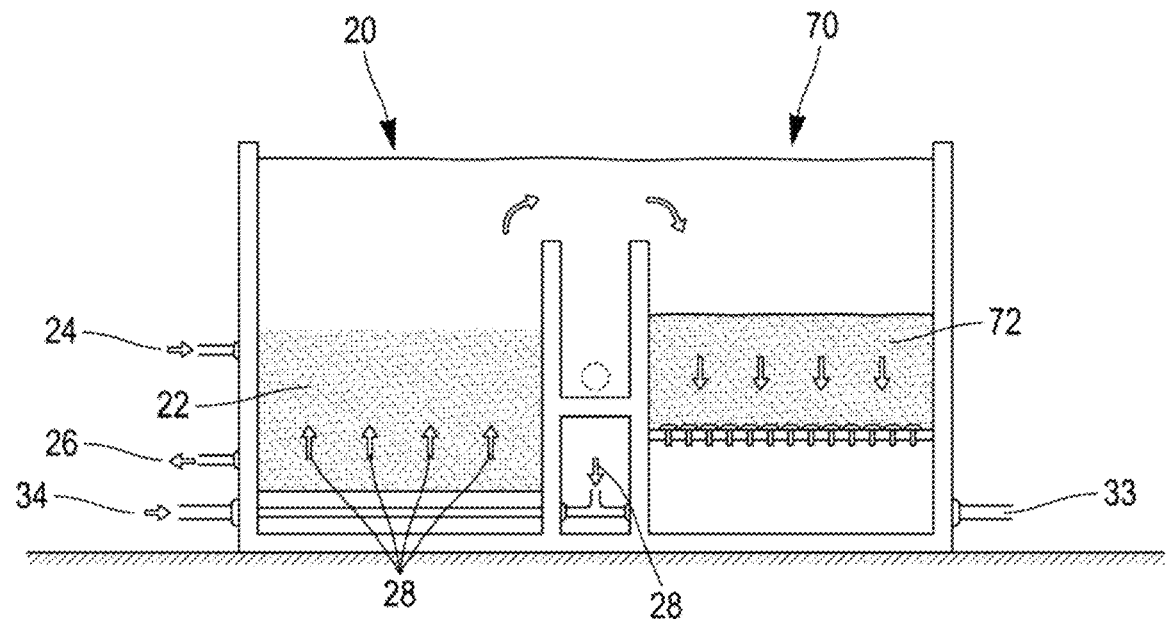
[Fig. 10]
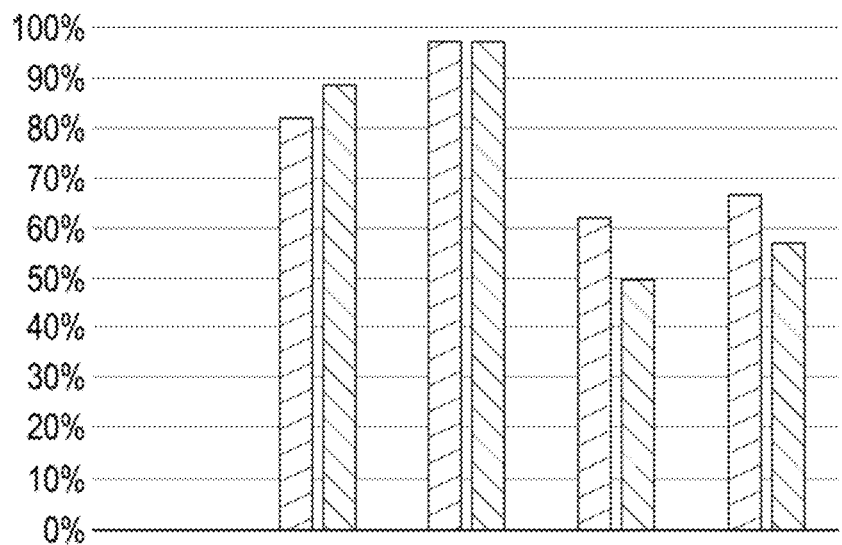

[Fig. 11]
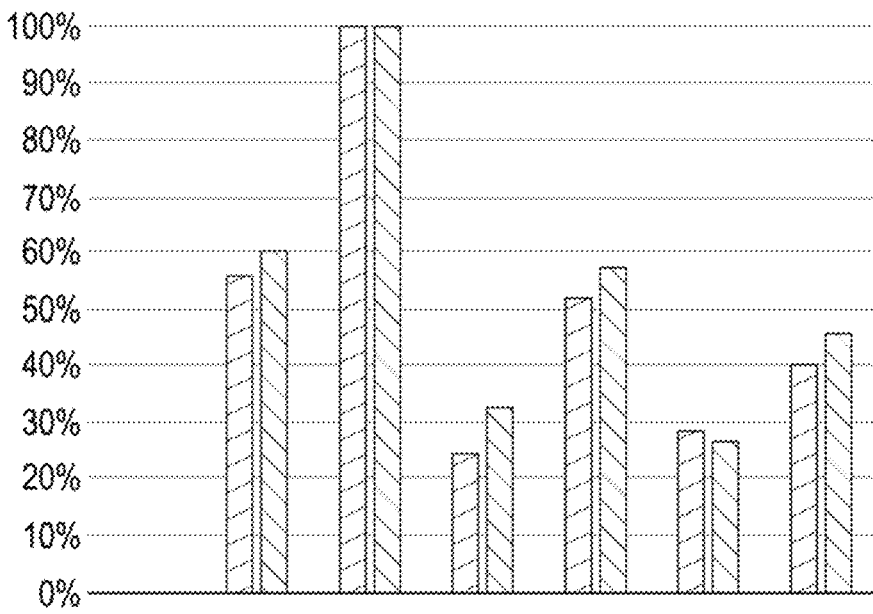
[Fig. 12]
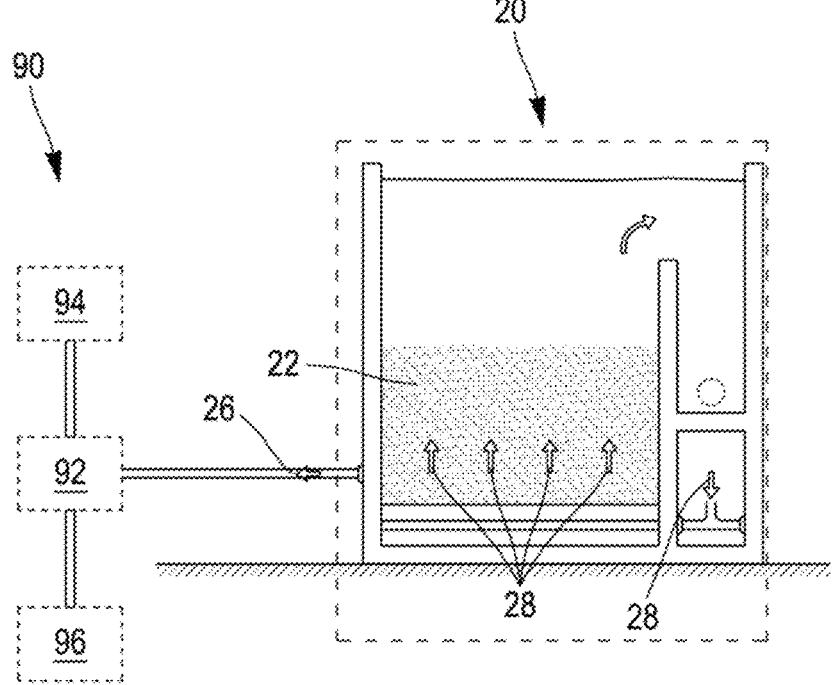

WATER TREATMENT METHOD WITH RENEWAL OF THE ADSORBENT TO A TARGETED INTERMEDIATE AGE

CROSS-REFERENCE TO RELATED APPLICATIONS

The application is a national phase entry of International Patent Application No. PCT/EP2021/075522, filed on Sep. 16, 2021, which claims priority to French Patent Application No. FR2009445, filed Sep. 17, 2020, both of which are incorporated by reference herein.

TECHNICAL FIELD

The invention relates to a method for treating a fluid, notably water, in particular water to be made safe for drinking, but also an urban or industrial effluent, which comprises an adsorption step. More specifically, the invention relates to a renewal step of the adsorbent with a mixed adsorbent of intermediate age determined as a function of an abatement objective.

BACKGROUND

For the treatment of fluids, and in particular for the production of drinking water, or for the treatment of effluents, it can be proposed to abate organic contaminants contained in raw water or in an effluent by means of an adsorption step of this matter. The increasing load of organic contaminants (natural organic matter and micropollutants of anthropic or natural origin) observed in resources has led producers of drinking water and effluent purifiers to remodel their treatment facilities which have become unable to achieve quality targets. This increasing load of organic contaminants also requires drinking water producers to design new treatment installations. Finally, effluent purifiers, whether for effluent of industrial or tertiary origin before discharge into the natural environment, or effluent to be made safe for drinking (wastewater for example), either directly or indirectly, can also draw advantage from treatment which takes into account a greater content of organic contaminants. The consideration given to this major pollution by organic contaminants can particularly include the addition, at the design or remodelling stage, of a refining facility, notably using activated carbon, such as filtration and/or adsorption in particular on a bed of granular activated carbon (GAC).

For example, it is known from document FR3003477 to have recourse to an activated carbon filter or activated carbon reactor to retain organic matter or other natural or artificial pollutants. Document FR3003477 particularly proposes the use of an upward flow of a granular activated carbon bed but without substantial expansion, and also a wash phase of the filter formed by the bed of activated carbon. Washing is implemented by substantial expansion of the bed. Document FR3003477 also proposes a periodic renewal phase of the bed of activated carbon, to renew the adsorption capacities of the bed of activated carbon.

In this field of water treatment, the consideration given to the emergence of organic micropollutants of synthetic origin still remains to be improved. In particular, some of these emerging pollutants are scarcely adsorbable, whether they be pollutants in the form of small-sized molecules, polar molecules, or hydrophilic molecules. They are chiefly pesticide metabolites which may therefore be found downstream of the adsorption step, such as an adsorption step with granular activated carbon. The level of these emerging pollutants after the treatment process may then exceed regulatory limits if these pollutants are specifically regulated, or at all events they represent a risk to be anticipated for emerging pollutants that are not yet regulated.

Yet, purification facilities using activated carbon, even those provided with periodic renewal, have been sized as a function of some conventional pollutants without being designed to adapt to these scarcely adsorbable emerging pollutants. There is therefore a need to improve treatment of a fluid by adsorption, such as water, to take into particular account these new, scarcely adsorbable contaminants.

SUMMARY

More particularly, the invention proposes a method for treating a fluid, notably water such as surface water or underground water, or even an effluent, comprising an adsorption step of pollutants contained in the fluid to be treated by means of an adsorbent bed, the method further comprising a renewal step to recover the adsorption capacities of the adsorbent bed, the renewal including:

extracting a sample of adsorbent from the adsorbent bed;

determining a target mean age of the extracted adsorbent sample, in particular by rejuvenating at least one portion of the extracted adsorbent sample, at which target mean age, the extracted adsorbent presenting a real abatement of pollutants corresponding to a previously fixed abatement objective;

rejuvenating the adsorbent bed to the determined target mean age.

According to preferred embodiments, the invention comprises one or more of the following characteristics:

the renewal step can be triggered periodically at a previously determined renewal frequency;

the renewal step can be triggered after a detection step of a quality defect of the fluid to be treated downstream of the adsorption step, preferably the detection step comprises the detection of a quality defect by comparing the level of pollutants or the number of pollutants between the upstream of the adsorption step and the downstream of the adsorption step;

the detection of a quality defect is performed when implementing the treatment of the fluid to be treated, preferably the detection of a quality defect being performed on the basis of a measuring method selected from among at least one of the measuring methods comprising: chromatography, mass spectrometry and fluorescence spectroscopy;

the extraction of the adsorbent is performed at a shutoff phase of the treatment of the fluid to be treated, preferably at a wash phase of the adsorbent, more preferably at a wash phase of the adsorbent via injection of air;

the extraction of the adsorbent is carried out when implementing the treatment of the fluid to be treated, by sampling at one or more points of the adsorbent bed;

when determining a target mean age of the extracted adsorbent sample, the real abatement of pollutants is determined by sampling the fluid to be treated downstream of the adsorption step, preferably the fluid to be treated sampled downstream of the adsorption step is doped prior to the determination of the real abatement of pollutants;

the determination of the target mean age of the adsorbent sample is obtained by measuring the real abatement of pollutants in a mixture of adsorbent of young age with at least one portion of the adsorbent sample extracted from the adsorbent bed, and the rejuvenation of the adsorbent bed to the determined mean age is obtained by the at least partial replacement of the adsorbent bed with the adsorbent of young age until the determined target mean age is obtained for the adsorbent bed;

the determination of the target mean age of the adsorbent sample is obtained by measuring the abatement of pollutants in adsorbent sub-samples obtained by mixing the extracted adsorbent with the adsorbent of young age, in varying proportions, the assembly of sub-samples having a range of intermediate mean ages between the age of the extracted adsorbent and the age of the adsorbent of young age, the mean age of the sub-sample exhibiting real abatement of pollutants best corresponding to the previously fixed abatement objective determining the target mean age;

the intermediate mean ages of the adsorbent sub-samples are 2 to 10 in number, preferably 3 to 5, the intermediate ages preferably being uniformly distributed between the age of the extracted adsorbent and the age of the adsorbent of young age;

the measurement(s) of pollutant abatement of the mixture(s) of adsorbent are obtained by short bed adsorber measurements, the tests preferably being performed on beds having a volume of less than or equal to 100 mL, more preferably less than or equal to 50 mL, further preferably less than or equal to 20 mL;

when determining a target mean age of the extracted adsorbent sample, the real abatement of pollutants is determined for a group of pollutants selected from the group formed by desethylhydroxyatrazine, metaldehyde, aminotriazole, metazachlorine, metazachlorine ESA, metalochlorine, metalochlorine ESA, desethylatrazine, chlortoluron, atrazine, terbuthylazine and optionally at least one from among the pollutant(s) identified as contributing towards the quality defect of the fluid to be treated triggering the renewal step;

the previously fixed abatement objective is defined as a minimum value of concentration abatement for each pollutant of a group of pollutants to be tested, the minimum abatement value for each pollutant preferably being between 50% and 90%, more preferably between 60% and 80%, or between 70% and 80%, the minimum abatement value optionally being the same for each pollutant in the group of pollutants to be tested;

the adsorbent bed comprises granular activated carbon, and the adsorption step is implemented by passing the fluid to be treated, notably water, in the form of an upward flow through the adsorbent bed, the method preferably comprising:

at least one filtration/adsorption phase at which the velocity of the fluid is sufficiently low so that it does not cause substantial expansion of the bed of activated carbon which ensures both filtration and adsorption of matter contained in the fluid;

and at least one expansion phase is provided at which the fluid circulates at sufficiently high velocity to cause substantial expansion of the bed of activated carbon which therefore undergoes washing by the fluid.

There is also proposed a fluid treatment installation according to the proposed treatment method, the installation comprising:

a reactor adsorbing the pollutants contained in the fluid to be treated, a bed of adsorbent being retained within the reactor, and the reactor being provided with an orifice for at least partial withdrawal of spent adsorbent from the adsorbent bed;

a mixer of adsorbent samples extracted from the adsorbent bed with adsorbent of young age;

a measuring unit of the real abatement of pollutants of the mixture of adsorbent of young age with the adsorbent extracted from the adsorbent bed, the measuring unit preferably being a short bed adsorber measuring unit, the tests preferably being performed on beds having a volume less than or equal to 100 mL, preferably less than or equal to 50 mL, further preferably less than or equal to 20 mL.

BRIEF DESCRIPTION OF THE DRAWINGS

FIG. 1 represents one embodiment of a water treatment facility with a pollutant adsorption step.

FIG. 2 represents a scheme of the proposed method.

FIG. 3 represents the results of measurements obtained by HPLC-HR & MS on water leaving the adsorption step.

FIG. 4 represents the results of measurements obtained by HPLC-HR & MS on decant water feeding the adsorption step.

FIG. 5 represents the results of measurements obtained by HPLC-HR & MS on raw water, upstream of the decantation step.

FIG. 6 represents measurements of real abatement of pollutants for sub-samples of mixtures with 3 intermediate mean ages.

FIG. 7 represents measurements of real abatement of pollutants for sub-samples of mixtures with 5 intermediate mean ages.

FIG. 8 represents an SBA testing machine.

FIG. 9 represents a bed of granular activated carbon operating in upward flow and representing a Carbazur UP method.

FIG. 10 represents comparative abatement tests between an SBA and Carbazur UP unit on a pilot scale for activated carbon of 50 000 BVT.

FIG. 11 represents comparative abatement tests between an SBA and Carbazur UP unit on a pilot scale for activated carbon of 80 000 BVT.

FIG. 12 represents a diagram of the proposed fluid treatment installation.

DETAILED DESCRIPTION

The proposed treatment method sets out to remove pollutants contained in a fluid to be treated. The fluid to be treated can be water, in particular water to be made safe for drinking, but also an urban or industrial effluent (in particular lixiviates which are liquid effluents from waste storage) before discharge into the natural environment, or effluents to be made safe for drinking (such as wastewater from urban effluents), either directly or indirectly.

In the remainder of this document, the term "pollutant" designates both organic matter and micropollutants. A micropollutant can be defined as an undesirable substance able to be detected in the environment in very low concentration (microgram per litre, even nanogram per litre). The presence of micropollutants in water is due at least in part to human activity (industrial processes, agricultural practice or medicinal or cosmetic residues). A micropollutant is characterized as being able, at these very low concentrations, of generating effects on living organisms on account of its toxicity, persistence and bioaccumulation, or on account of organoleptic pollution (taste or smell, of particular relevance when treating water to be made safe for drinking). Micropollutants are very numerous (over 110 000 molecules are listed by the European regulations) and varied. The variety of pollutants allows classification thereof according to origin, type, or according to their highly different chemical properties. For example, micropollutants can be of natural origin (such as compounds derived from soil degradation including geosmin, methylisoborneol-MIB, or bacterial residues), of vegetable origin (such as metabolites of algae including microcystins), of animal or human origin. Micropollutants can be classified according to type, for example polar organic compounds abbreviated to POC, or metal organic compounds abbreviated to MOC. Micropollutants can have very different chemical properties, such as detergents, metals, hydrocarbons, pesticides, cosmetics or medicinal products. The proposed fluid treatment method therefore particularly applies to compounds of pesticide type and to associated metabolites. This method also particularly applies to solvents. This method further particularly applies to pharmaceutical residues or residues from industrial activity. All these categories of pollutants or micropollutants are therefore specifically concerned by the proposed method.

The proposed fluid treatment method comprises an adsorption step of pollutants contained in the fluid to be treated. This adsorption step is performed using a bed of adsorbent. The adsorbent (or adsorbing media) is an activated carbon for example, such as a granular activated carbon (GAC) in particular. The granular activated carbon used for the proposed method has a particle size of between 400 and 1700 μm for example, for at least 85 to 90% of the granules, or preferably a particle size of between 800 to 1200 μm for at least the majority (50%) of granules. The indicated dimensions are those of the equivalent diameter of the particles for dry or wet screening. Granular activated carbon can typically have an iodine number higher than 950 or 1000 mg/g when in new condition. The iodine number is the amount in milligrams of adsorbed iodine per gram of activated carbon. This number is used to quantify the adsorbing power of a given adsorbing media. Measurement of the iodine number can be obtained in particular following the protocol standardised by standard ASTM D4607-14.

The treatment method with an adsorption step can correspond to the water treatment method illustrated in FIG. 1. According to the method illustrated therein:

The water to be treated 12 is first sampled at step 10. This water 12 more broadly termed resource or raw water, is taken for example from a watercourse such as illustrated. It is a typical example of surface water. This resource can also be sampled by drilling, in which case the water is said to be underground water. It can also be an effluent of urban origin (such as wastewater otherwise called residual municipal wastewater) or of industrial origin.

The sampled water can then undergo a pre-treatment step via clarification 14 comprising for example a settler or floater to obtain separation achieved for example by coagulation to retain particulate or colloidal matter, optionally followed by filtration particularly sand filtration such as illustrated. The type of pre-treatment can depend upon the origin of the fluid to be treated. If the resource to be treated is underground water, this pre-treatment step can particularly be avoided as is the case for surface water. For effluent, it is advantageous to provide for pre-treatment also including biodegradation, for example upstream of clarification.

Thereafter the water is subjected to an adsorption step 18 by means of a reactor 20 for example.

After this adsorption step 18 and optional filtration step (not illustrated), the treated water can be distributed at a distribution step 80.

The proposed method can be schematized according to FIG. 2.

The efficacy of the adsorption step 18 is improved with a renewal step 40. The adsorption capacity of adsorbents such as activated carbon decreases as and when they are used to adsorb pollutants. The renewal step of the media allows the adsorption capacities of the adsorbent bed to be recovered.

In the proposed method, this renewal step first comprises the extraction 42 of a sample of adsorbent from the adsorbent bed. This sample, like the remainder of the bed, exhibits some decrease in its adsorption capacities further to use thereof as pollutant adsorbent. This decrease in capacities is generally approached with the notion of productivity, itself often partly equated with age of the sample. Age of the sample, equated with productivity thereof, can therefore be quantified in bed volume treated BVT or bed volume BV. Bed volume treated corresponds to the volume of treated fluid, more particularly water, by the adsorbent relative to the volume of the adsorbent. Therefore, the higher the productivity of the adsorbent, the more fluid it has treated and the more it is spent or aged, and it can then be assumed that the adsorption capacities thereof have been reduced.

On the basis of this extracted and therefore aged sample, the renewal in the proposed method comprises the determination 44 of a rejuvenated age at which the sample of adsorbent would recover better pollutant abatement. This rejuvenated age is a target mean age to be obtained so that the adsorbent exhibits more satisfactory pollutant abatement than the pollutant abatement of the sample of adsorbent at the time of extraction thereof. The target mean age is then defined as the age at which the extracted adsorbent exhibits a real abatement of pollutants corresponding to a previously set abatement objective.

To determine this target mean age, provision can be made to apply rejuvenation to at least one portion of the extracted adsorbent sample. In one preferred embodiment, this rejuvenation is in the form for example of a mixture of at least one portion of the extracted adsorbent sample with an adsorbent of young age. By "adsorbent of young age" it is meant an adsorbent of younger age than the extracted adsorbent sample (without which the mere mixing with this adsorbent would not allow rejuvenation). In particular, this adsorbent of young age can be fresh adsorbent i.e. an adsorbent which, after production, has not yet been used as adsorbent. This adsorbent of young age can also be regenerated adsorbent, notably the case for activated carbon. A regenerated adsorbent corresponds to an adsorbent which, after cycles of use as adsorbent, has been treated for example thermally or chemically to recover adsorption capacities close to those of the fresh adsorbent. The fresh adsorbent or regenerated adsorbent is of an age considered to be zero when expressed in BVT. Therefore, regeneration leads to productivity being reset to zero equated with age such as seen above. Even if regeneration allows recovery of adsorption capacities, the regenerated adsorbent may nevertheless exhibit more limited adsorption capacities than the same adsorbent in new condition. These more limited adsorption capacities after regeneration can be characterized for example by the iodine adsorption number or iodine number. This iodine number is the amount of adsorbed iodine in milligrams per gram of adsorbent and is used to quantify the adsorbing power of an adsorbent media. For example, for a fresh adsorbent, the iodine number can be higher than 950 or 1000 mg/g (as for the preferred activated carbon). Conversely, for a spent adsorbent, the iodine number can be lower than 400 mg/g. Regeneration of the adsorbent can then lead to recovering a iodine number preferably higher than 600 mg/g or more preferably higher than 700 mg/g. Regeneration can be carried out off-site, in particular by the supplier of the adsorbent, via reactivation such as heat treatment higher than 800° C. for an adsorbent in the form of activated carbon. The iodine number obtained for said regeneration can then be higher than 800 mg/g or even higher than 850 mg/g. Regeneration can also be carried out at the site of the treatment installation via chemical or heat treatment, in particular at temperatures lower than reactivation at 800° C. This on-site regeneration advantageously allows recovery of part of the adsorption capacities (iodine number between 600 and 800 mg/g) without necessarily requiring more restrictive off-site reactivation.

After rejuvenation of the extracted sample and for the purpose of determining the target mean age, the proposed method may comprise measurement of pollutant abatement by the extracted adsorbent henceforth rejuvenated by mixing. This measurement of pollutant abatement can in particular be performed directly by comparison of pollutant concentrations between upstream and downstream of fluid treatment with the rejuvenated extracted adsorbent. Pollutant abatement can also be measured indirectly by measuring a level of pollutants using an iodine number measuring method for example (such as previously discussed) or by chromatography, mass spectrometry or fluorescence spectroscopy (such as discussed below, therefore in particular by HPLC, HPLC-HR or HPLC-HR & MS). This level of pollutants thus determined can then be correlated with a real concentration of pollutants, for example using predetermined alignment charts for each pollutant.

This measurement of pollutant abatement by the sample of rejuvenated adsorbent bed is to be compared with the previously set abatement objective. When this objective is reached, the sample of rejuvenated adsorbent bed then has a mean age that will form the rejuvenation target to be obtained for the entire adsorbent bed.

The target mean age having been determined, the proposed method next comprises rejuvenation 46 of the adsorbent bed to the determined target mean age. Rejuvenation of the adsorbent bed may particularly comprise at least partial replacement of the adsorbent bed with the adsorbent of young age up until the target mean age is reached that was determined for the adsorbent bed. The quantity of adsorbent of young age to be added is calculated for example using the arithmetic mean of the quantity of spent adsorbent remaining in the bed and the quantity of adsorbent of young age added to the bed. In general, to ensure an adsorbent bed having near-constant volume, provision is made to reduce the quantity of remaining spent adsorbent before the addition of adsorbent of young age.

This rejuvenation performed by at least partial replacement of the adsorbent bed with adsorbent of young age, can particularly be implemented for the preferred embodiment with determination of the target mean age by mixing the sample with adsorbent of young age. In this case, the rejuvenation performed to determine the target mean age is the reproduction on a smaller scale of the rejuvenation of the entire adsorbent bed. This case has the advantage of more fine-tuned control over the recovery of adsorption capacities obtained for the rejuvenated adsorbent bed.

In the proposed method, to determine a target mean age at which the carbon bed is to be renewed, the pollutant abatement of the rejuvenated extracted adsorbent is termed "real abatement of pollutants". The abatement is termed real in that it is determined on the basis of a sample of the adsorbent effectively used in the treatment method.

Through this determination of real abatement, the proposed method particularly sets itself apart from methods of theoretical evaluation of pollutant abatement by an adsorbent such as proposed in the prior art.

Some prior art methods propose renewals of the adsorbent bed with partial and periodic replacement of the adsorbent bed by fresh adsorbent, such as aforementioned document FR3003477 or document FR2874913. In these methods, there is theoretically determined, before industrial implementation, a limit operational value of bed volume treated which corresponds to a limit mean age on and after which the theoretical abatement of pollutants is no longer considered to be satisfactory. Programming of the periodicity of renewal ensures a theoretically satisfactory abatement of pollutants taking into account this limit value determined prior to industrial application of the method. Determination of theoretical abatement can be carried out for example using a Homogeneous Surface Diffusion Model (HSDM), in particular when the adsorbent is activated carbon.

Yet, for one same bed volume treated, two beds of adsorbent can show different capacities of pollutant abatement, depending upon real variations in concentrations and the type of pollutants actually treated by each of these adsorbent beds. Also, the theoretical adsorption capacities for a bed volume treated are generally determined pollutant by pollutant but without taking into consideration the competition between organic matter and micropollutants at adsorption sites or the competition of micropollutants between each other (also called "cocktail effect"). For example, highly adsorbable micropollutants will have a tendency to saturate the adsorption sites before the less adsorbable micropollutants have been adsorbed. Therefore, the competition between pollutants at adsorption sites is particularly the case for compounds having a low affinity for adsorption (small polar molecules) such as pesticide metabolites. The theoretical determinations of adsorption capacities as a function of bed volume treated can therefore tend to overestimate the residual adsorption capacities of a real adsorbent bed.

With the method proposed herein, the age objective for targeted abatement is obtained on the basis of a sample extracted from the adsorbent bed operated industrially. Therefore, this age objective is not theoretically frozen by prior testing or modelling of adsorbents of equivalent wear (such as measured in bed volume treated). On the contrary, in the proposed method this sample is therefore representative of the true wear of the adsorbent bed and in particular takes into consideration the consequences of competition between pollutants in fluids at adsorption sites that the adsorbent has truly treated. The determination of the target mean age from this sample therefore allows optimised rejuvenation of the adsorbent bed taking into account the real history of the adsorbent bed.

The proposed fluid treatment method therefore meets new restrictions arising from new contaminants that are difficult to adsorb, by providing control over a constant age of the adsorbent to ensure permanently efficient removal of targeted or non-targeted pollutants. This is made possible via sequential renewal of the adsorbent.

The renewal of the adsorbent and of GAC in particular can be obtained by extracting one portion of the adsorbent and replacing the latter by younger adsorbent. In particular with regard to GAC, the younger adsorbent can be fresh GAC or regenerated GAC.

The sequential renewal of the adsorbent allows modification of the volume of renewal and/or the frequency of renewal which is therefore adapted as a function of the variation in quality of raw water. In other words, the proposed method allows piloting of the treatment method with adsorption via adjustment of the dose of adsorbent to be renewed, by monitoring the real state of saturation of the adsorbent. The proposed method therefore allows better treatment of a fluid such as water to take into particular account new adsorbents that are difficult to adsorb.

In addition, again due to the fact that the sample is extracted from the adsorbent bed, the proposed method allows determination of the real abatement of the sample, in particular in a fluid that is effectively to be treated. Therefore, in one preferred embodiment, when determining a target mean age of the extracted adsorbent sample, the real abatement of pollutants is determined by means of a sample of the fluid to be treated taken downstream of the adsorption step. The fluid to be treated is also termed a matrix in particular in the field of wastewater treatment. The proposed method evaluates the target mean age at which the bed of adsorbent must be rejuvenated, and determines this target mean age by means of samples of adsorbent and fluid which therefore exactly correspond to the future conditions of use of the adsorbent bed having the determined target mean age. The determination of target mean age by extracting a sample of adsorbent, in that it also allows the taking into account of a sample of the real matrix, allows further optimised rejuvenation of the adsorbent;

This optimisation is notably advantageous when compared with a prior art method which determines residual adsorption capacities on the basis of a pre-established model with a matrix that is sampled solely at the time of the design of the model and thereafter remains fixed. In particular, in document EP 3 153 475 there is proposed a treatment method with a reactor having a bed of activated carbon which controls renewal of the bed in accordance with a UV abatement yield correlated with abatement of micropollutants, on the basis of a model determined by means of a matrix sampled even before the reactor is set in operation. With said method of the prior art, the rejuvenation rate of the adsorbent bed is evaluated on the basis of a matrix which no longer corresponds to the matrix actually treated by the adsorbent. Said method can therefore no longer be adapted for determination of real pollutant abatement in the event of emerging pollutants. This lack of adaptation to emerging pollutants is all the more critical when these emerging pollutants are scarcely adsorbable such as pesticide metabolites. Conversely, the method proposed herein by permitting determination of the target mean age on the basis of the current matrix, ensures that renewal of adsorption is adapted to these pollutants which may come to be found in the matrix. The proposed method, in particular for the renewal of the adsorbent bed piloted by extraction of a sample of adsorbent, therefore provides better treatment of a fluid such as water to take into account new contaminants in particular that are scarcely adsorbable.

In one preferred embodiment, the renewal step can be triggered on detection of a quality defect in the fluid to be treated. Therefore, the proposed method can comprise a step to detect a quality defect in the fluid to be treated, after which the renewal step is triggered. This step can be performed downstream of the adsorption step. With this downstream positioning of detection, it is then possible to determine whether there has been "breakthrough" of the adsorbent bed. The term bed breakthrough or filter breakthrough is used. In particular in the field of water treatment, it is said that there is filter breakthrough when it allows the passing of pollution or elements that this filter is supposed to retain. In other words, it is proposed to renew adsorbent such as granular activated carbon via the monitoring, at the adsorption filter egress, of a quality parameter of the fluid to be treated, such as water. When a limit value is reached, renewal of the adsorbent bed is triggered.

This triggering, further to detection of a quality defect, allows even better consideration to be given to scarcely adsorbable new contaminants. The detection of a quality defect can be implemented with regard to targeted (or predetermined) pollutants. In this case, the detection step specifically targets some predetermined pollutants that are to be monitored. However, this detection step can also be implemented for non-targeted pollutants. The fluid to be treated, notably water, can be subjected to measurements allowing the determination of the presence of impurities, pollutants without prior determination of the type of pollutants.

Said non-targeted detection of pollutants in water (or a fluid to be treated) can be implemented in particular by at least one of the measuring methods comprising: chromatography, mass spectrometry and fluorescence spectrometry (also called 3D fluorescence). In particularly preferred manner, the measuring method can be high performance liquid chromatography (HPLC), in particular with high resolution abbreviated to HPLC-HR) and further particularly coupled with mass spectrometry (MS). Figures FIG. 3, FIG. 4 and FIG. 5 correspond to graphic illustrations of measurement results obtained with this latter measuring method HPLC-HR & MS. Each dot in the graph corresponds to a molecule or type of molecule that reacted at chromatography. Each dot therefore corresponds to the imprint of a pollutant or type of pollutant. By metonymy, the graph is also termed an imprint. For each of these dots in the graph, these Figures along the X-axis represent the retention time of the molecule corresponding to the dot, a time measured in minutes. Along the Y-axis, these Figures give the mass-to charge ratio for each molecule corresponding to a dot. This value is measured in m/z i.e. in mass per ionic charge. Finally, for each dot, these Figures represent the intensity of the chromatographic response with a black dot for strong intensity, a grey dot for medium intensity and a white dot surrounded by a black circle for low intensity. This intensity of chromatographic response is related to the concentration of the impurity or pollutant represented by this dot.

Figure FIG. 3 particularly shows the result of measurements performed on a fluid downstream of the treatment step by adsorption of the fluid, such as at point 33 illustrated in FIG. 1. This graph allows evidencing of the presence of impurities in the fluid to be treated, in particular of pollutants in the water. This evidencing is not targeted: when a dot appears in the graph, this corresponds to the presence of an impurity or pollutant without necessarily having identified the exact type of this pollutant or without having sought to detect this pollutant specifically. Therefore, if FIG. 3 at a time t shows a dot not present in the preceding measurement, breakthrough of the adsorbent bed can be suspected by the pollutant corresponding to this dot, therefore a pollutant that is not specifically targeted. However, the breakthrough by an emerging pollutant such as a pesticide residue can be particularly detected with said method of non-targeted measurement, whereas methods of targeted measurement are generally targeted on more conventional pollutants.

As illustrated in particular in Figures FIG. 3, FIG. 4 and FIG. 5, in one preferred embodiment, the detection of a quality defect is performed by comparison of the quality of the fluid to be treated between upstream of the adsorption step and downstream of the adsorption step. The measurements in Figures FIG. 3, FIG. 4 and FIG. 5 were performed on one same treatment line of water sampled from the Seine River:

FIG. 4 shows the result of measurements taken after a first fluid treatment step, in this instance after a decanting step of the fluid to be treated such as at point 34 illustrated in FIG. 1;

FIG. 5 gives the result of measurements taken at the sampling point of the fluid to be treated, such as at point 35 illustrated in FIG. 1.

In particular, according to the method retained for these Figures, it is possible to compare the number of pollutants between upstream of the adsorption step and downstream of the adsorption step. If a dot which appeared downstream of adsorption is abnormally maintained upstream of adsorption, the adsorbent no longer retains this pollutant. It may therefore be advantageous to trigger renewal of the adsorbent bed. Similarly, if a dot appears downstream of the adsorption step whereas it is not present upstream, then the adsorbent bed has released a pollutant that it had previously adsorbed. Here again, it would be advantageous to trigger renewal of the adsorbent bed. Alternatively, or in addition, particularly by means of mass spectrometry or other measurement methods, it can also be envisaged to compare the level of pollutants between upstream of the adsorption step and downstream of the adsorption step. Figures FIG. 3, FIG. 4 and FIG. 5 particularly evidence the medium or strong concentration of an impurity according to the intensity of the represented dot. On the basis of this information on pollutant concentration or pollutant level, and in particular if a dot changes from low or medium intensity to strong intensity, it can be advantageous to trigger renewal of the adsorbent bed. In this preferred embodiment with comparison of the quality of the fluid to be treated between upstream and downstream of the adsorption step, the measuring method can be implemented alternately upstream then downstream using a single analysis sensor shared by measurements at these two points.

Preferably, the detection of a quality defect of the fluid to be treated, whether upstream or downstream of adsorption, can be performed in-line during the treatment method. Monitoring can then be ensured by in-line analysers particularly based on fluorescence or chromatography methods, whether these are targeted or non-targeted (imprint) such as seen above. This in-line monitoring allows the detection of a quality defect on implementation of treatment of the fluid to be treated, optimising the volume of treated fluid. This in-line detection step can be carried out continuously or near-continuously with a period between detections that is shorter for example than the passing time of a bed volume into the adsorbent bed. Additionally, this detection step can also be carried out on demand by the operator. At all events, it is not then necessary to interrupt the production of treated fluid in order to determine whether a quality defect has become apparent and whether a renewal step of the bed must be triggered.

Alternatively, or in addition, the renewal step can be triggered periodically at a previously determined renewal frequency. The renewal period can then be defined to limit risks of breakthrough of the adsorbent bed, and for rejuvenation of the adsorbent according to the proposed method. The previously set abatement objective according to the proposed method can then be defined as being the nominal pollutant abatement for which it is determined that the abatement of residual pollutants after the renewal period is sufficient to reach the quality standards required by the operator.

Preferably, the previously set abatement objective is defined as a minimum abatement value of the concentration of each pollutant in a group of pollutants to be tested. This abatement for a pollutant is usually given as a percentage fraction of the quantity of retained pollutant in relation to the quantity of ingoing pollutant. It is therefore a relative value. This relative value nonetheless allows the regulatory threshold to be met for pollutant concentration after treatment in relation to predictable concentrations of ingoing pollutants. For each pollutant, this minimum abatement value can be between 50% and 90%, preferably between 60% and 80%, or even between 70% and 80%. The minimum abatement value can be defined differently according to pollutant or it can be the same for all the pollutants to be tested. In particular, in this embodiment and more generally in the proposed method, the real abatement of pollutants can be determined separately for each pollutant in a group of pollutants to be tested.

All the pollutants for which the real abatement of pollutants is determined can in particular be selected from the group formed by desethylhydroxyatrazine, metaldehyde, aminotriazole, metazachlorine, metalochlorine, desethylatrazine, chlortoluron, atrazine, terbuthylazine. If provision is made for a detection step of targeted pollutants, in particular downstream of the adsorbent bed, it is particularly advantageous that the pollutant(s) identified as forming a quality defect should be integrated into the group of pollutants for which real abatement of pollutants is determined.

As previously seen, it is preferable for determination of the real abatement by the sample of extracted rejuvenated adsorbent, that a sample of the fluid to be treated should be taken downstream of the adsorption step in particular. More preferably, the fluid once sampled is doped with pollutants before determining the real abatement of pollutants. This doping allows shortening of the time needed to determine real abatement. For example, doping is obtained by increasing the concentration of the pollutant(s) under consideration in the sampled fluid. Typically, desethylhydroxyatrazine, metaldehyde, aminotriazole, metazachlorine or metalochlorine can each be doped by increasing the concentration thereof by 1 to 10 µg/l, preferably by 1 to 2 µg/l, more preferably by 1 µg/l to 2 µg/l. Similarly, desethylatrazine, chlortoluron, atrazine, terbuthylazine can each be doped by increasing the concentration thereof by 1 to 10 µg/l, preferably by 9 to 10 µg/l.

As previously seen, with or without the use of a sample of the fluid to be treated and with or without doping of this sampled fluid, the determination of the target mean age of the adsorbent sample is preferably obtained by measuring the real abatement of pollutants in an adsorbent mixture. This adsorbent mixture corresponds to a mixture of adsorbent of young age, such as fresh or regenerated adsorbent in particular, with at least one portion of the adsorbent sample extracted from the adsorbent bed.

In one further preferred embodiment, the real abatement is measured on several sub-samples obtained from the sample of extracted adsorbent. These sub-samples are obtained by mixing the extracted adsorbent with adsorbent of young age. The mixing to obtaining the sub-samples is performed in variable proportions so as to obtain an assembly of sub-samples having a range of mean ages. This range of mean ages makes it possible to have intermediate ages distributed between the age of the extracted adsorbent and the age of the adsorbent of young age. A range of intermediate mean ages allows the performing of as many measurements of real abatement, ensuring best approaching of the optimal age at which the extracted adsorbent should be rejuvenated so that it exhibits a real abatement best corresponding to the previously set abatement objective. Among these sub-samples, the one having the real abatement of pollutants that best meets the previously defined abatement objective, is then the one used to determine the target mean age of the proposed method. In particular, the target mean age can be taken to be the age of the mixture forming this sub-sample. Alternatively, the target mean age can be taken to be the average or extrapolation of the age of the mixture of this sub-sample with the age of the sub-sample immediately above in age within the range of intermediate ages. Further to determination of the target mean age, rejuvenation of the adsorbent bed is carried out until the target mean age is obtained.

The number of intermediate ages for the assembly of sub-samples can be 2 to 10 or preferably 3 to 5. A reasonable number of sub-samples ensures estimation of a target mean age that is sufficiently close to the optimal age. By taking into consideration the number of sub-samples, it is preferred that the intermediate ages should be uniformly distributed between the age of the extracted adsorbent and the age of the adsorbent of young age. This uniform distribution increases the probability of arriving at a target mean age that is close to the optimal age for rejuvenation of the extracted adsorbent.

Figures FIG. 6 and FIG. 7 give measurements of the real abatement of pollutants for sub-samples of mixtures respectively having 3 and 5 intermediate mean ages. FIG. 6 was obtained with measurements of real abatement on the basis of a sample of adsorbent, in this instance granular activated carbon having an age in bed volume treated (BVT) of 45 000 and treating Seine water sampled closed to Mont Valérien with doping of the pollutants at 10 µg/l. FIG. 7 was obtained with measurements of real abatement on the basis of a sample of adsorbent, in this instance granular activated carbon having an age in bed volume treated of 140 000 treating Seine water sampled close to Morsang sur Seine with doping of pollutants at 10 µg/l. The abatement measurements were all made on samples of the water taken downstream of the adsorption step. These Figures along the X-axis show the reconstituted mean ages of the sub-samples expressed in BVT. Along the first Y-axis, these Figures show the fraction of adsorbent from the extracted sample and the fraction of fresh adsorbent respectively. Along the second Y-axis, these Figures show the real abatement measured for the sub-samples as a function of the tested pollutant.

In particular, the last columns in these Figures give the real abatement per pollutant of the adsorbent bed represented by the extracted sample, before any rejuvenation. In this instance, in FIG. 6 for the extracted sample at 45 000 BVT, the abatement of pollutants from the worst to the best can be seen in that order for metaldehyde (dotted line), metazachlorine (mixed dashed line), metalochlorine at the same point as desethylhydroxyatrazine (both in a thin solid line), but before the common point desethylhydroxyatrazine had a higher abatement level than metalochlorine) and finally aminotriazole (bold solid line). In FIG. 7 for the extracted sample at 140 000 BVT, the abatement of pollutants from the worst to the best in that order can be seen for metaldehyde (dotted line), aminotriazole (thin solid line), metazachlorine (mixed dashed line) and finally desethylhydroxyatrazine having the same curve as metalochlorine (bold solid line).

First, these two Figures clearly show that according to the real history of the adsorbent bed (in this instance granular activated carbon), breakthrough does not always occur at the same time and in the same order for a given group of pollutants. In particular, in FIG. 6 aminotriazole did not cause breakthrough of the bed, whereas in FIG. 7 breakthrough of the bed by aminotriazole exceeds that of metazachlorine. This observation confirms that it is advantageous for real abatement measurements to be made on a sample of fluid to be treated taken downstream of the adsorption step, such as previously seen.

These Figures further show the advantage of reconstituting (or simulating) rejuvenated mean ages for the extracted adsorbent. In these Figures, the adsorbent has been rejuvenated with a mixture having variable proportions of adsorbent of young age. The range of reconstituted median ages allows best determination of the reconstituted age at which the abatement of all the tested pollutants can be considered as meeting a previously set abatement objective. In this instance, if an abatement of 90% is sought of all these pollutants, the adsorbent bed at 45 000 BVT can be rejuvenated to 15 000 BVT by replacing nearly 70% of the adsorbent bed by fresh adsorbent FIG. 6. For this same abatement objective, the adsorbent bed at 140 000 BVT can be rejuvenated to 100 000 BVT by replacing close to 30% of the bed adsorbent by fresh adsorbent FIG. 7.

In one particularly advantageous embodiment, the measurements of pollutant abatements of the adsorbent mixture(s) are performed by Short Bed Adsorber tests (SBA). FIG. 8 illustrates a SBA testing machine 60 with 8 filtration cartridges 62 filled with adsorbent of the extracted sample and mixed in varying proportions with adsorbent of young age.

In the proposed method, these SBA tests have the advantage of allowing testing using little adsorbent to be extracted and proposing results with relatively short contact times, such as approximately 6 minutes corresponding to the contact time in the adsorbent bed from which the adsorbent sample is extracted. The contact times for SBA tests or for the adsorbent bed from which the sample is extracted, can vary from 4 to 10 minutes, or 5 to 20 minutes and up to 30 minutes depending on operating conditions. These contact times are compatible with SBA beds having a volume less than or equal to 100 mL, less than or equal to 50 mL, or even less than or equal to 20 mL. With or without implementation of SBA tests, the quantity of adsorbent in the extracted sample can be less than 2 L, preferably less than 1 L, or even less than 200 mL or 100 mL.

With or without the use of sub-samples, and in particular of sub-samples for SBA, in one embodiment of the proposed method the extraction of adsorbent is carried out at a shutoff phase of treatment of the fluid to be treated. It is then preferred, to conduct such extraction, that the shutoff phase should correspond to a shutoff phase meeting purposes other than the sole extraction of a sample of adsorbent, such as a wash phase of the adsorbent and in particular a wash phase of the adsorbent by injecting air. Alternatively, adsorbent extraction is conducted at the time of implementing the treatment of the fluid to be treated. Sampling is then made at one or more points of the adsorbent bed to obtain a sample of adsorbent representing wear of the entire adsorbent bed.

In one preferred embodiment, the proposed method is implemented as part of an upflow treatment method with activated carbon (hereafter Carbazur UP), such as disclosed in document FR 3003477 previously cited and to which reference is made. In particular, the proposed treatment method can be a treatment method with upflow of fluid through a bed of granular activated carbon, the method comprising:

at least one filtration/adsorption phase at which the velocity of the fluid is sufficiently low so that it does not cause substantial expansion of the bed of activated carbon which ensures both filtration and adsorption of the matter contained in the fluid;

and at least one expansion phase is provided at which the fluid circulates at sufficiently strong velocity to cause substantial expansion of the bed of activated carbon which then undergoes washing by the fluid.

Said embodiment is illustrated in particular in FIG. 9 showing a bed of granular activated carbon operating in upward flow. FIG. 9 particularly shows the reactor 20 comprising the bed of granular activated carbon 22. The bed 22 operates by upflow of the water to be treated 28. The reactor 20 may comprise an inlet 24 and outlet 26 of activated carbon for renewal of the carbon bed. The reactor 20 may comprise an air inlet 34 to allow washing of the bed with air and not solely by the fluid. The reactor 20 may be contiguous with a filter 70. This filter 70 can be composed of a downflow bed 72 of activated carbon such as illustrated. The water, after being filtered by the filter 70, is evacuated via outlet 33.

The representativity of the determination of a real abatement of pollutants with SBA tests was evaluated by comparison with the case of the aforementioned Carbazur UP method. FIGS. 10 and 11 show comparative tests between measurements of abatement of pollutants via adsorbent on SBA and measurements of abatement of pollutants on Carbazur UP units on a pilot scale. These pilot scale Carbazur UP units correspond to laboratory models designed to be representative of the operation of one same line on an industrial scale. FIGS. 10 and 11 along the X-axis show the different tested pollutants, and along the Y-axis the rate of abatement of these pollutants. For each tested pollutant, the left-hand bar represents abatement measured on the pilot and the right-hand bar represents abatement measured by SBA tests.

Figure FIG. 10 compares the SBA test and Carbazur UP test for a granular activated carbon of age 50 000 BVT with Seine water, and a contact time of 6 minutes (the contact time is the Empty Bed Contact Time—EBCT). From left to right, the tested pollutants are: desethylhydroxyatrazine, aminotriazole, metazachlorine and metalochlorine.

FIG. 11 compares the SBA tests and Carbazur UP for a granular activated carbon of age 80 000 BVT with Seine water, and an EBCT contact time of 10 minutes. From left to right, the tested pollutants are: desethylhydroxyatrazine, aminotriazole, metazachlorine, metalochlorine, metazachlorine ESA and metalochlorine ESA (ESA being the abbreviation of Ethan Sulfonic Acid).

As illustrated in FIG. 10 and FIG. 11, the abatement levels measured according to the two methods are very largely comparable. The SBA test as implemented in the innovation, is a method characterizing the saturation level of specific compounds and is representative of a pilot. A pilot is designed and sized taking into account relevant factors of the industrial unit (bed height, contact time . . . ). The SBA test, representative of the pilot, is therefore also representative of the industrial unit.

There is also proposed a fluid treatment installation to implement the above proposed method for all the variants comprising measurement of the real abatement of pollutants in a mixture of adsorbent of young age with the adsorbent extracted from the adsorbent bed. The proposed installation therefore comprises a measuring unit. The proposed installation further comprises an adsorption reactor. This reactor contains an adsorbent bed retained therein. This reactor allows adsorption of pollutants contained in the fluid to be treated.

Said reactor is particularly illustrated in FIG. 9 seen previously, or in FIG. 12 detailed below. As illustrated in FIG. 12, the proposed installation 90 includes the reactor 20 which comprises an orifice 26 for at least partial withdrawal of spent adsorbent from the adsorbent bed 22. As illustrated, the adsorbent bed 22 is able to operate with upflow of the fluid to be treated 28. In the proposed installation, the sample of adsorbent is directed towards a mixer 92. The proposed installation can therefore comprise said mixer 92. This mixer ensures the mixing of the sample of spent adsorbent with adsorbent of young age derived for example from a storage 94 of adsorbent of young age. The proposed installation may comprise said storage 94. The mixer 92 can allow the obtaining of a single sample of intermediate age, or an assembly of sub-samples having a range of intermediate mean ages between the age of the extracted adsorbent and the age of the adsorbent of young age. In the proposed installation, the mixture obtained whether forming a single sample or assembly of sub-samples is directed into a measuring unit 96. This measuring unit 96 measures the real abatement of pollutants in the mixture of adsorbent of young age with the adsorbent extracted from the adsorbent bed.

As previously described, this measuring unit 96 is preferably a Short Bed Adsorber (SBA), the test preferably being performed with beds of volume less than or equal to 100 mL, more preferably less than or equal to 50 mL, further preferably less than or equal to 20 mL. Such as previously described, the measuring unit 96 preferably allows determination of a target mean age of the sample of extracted adsorbent, for a group of pollutants selected from the group formed by desethylhydroxyatrazine, metaldehyde, aminotriazole, metazachlorine, metazachlorine ESA, metalochlorine, metalochlorine ESA, desethylatrazine, chlortoluron, atrazine, terbuthylazine. Optionally, the group of pollutants also comprises the pollutant(s) identified as contributing towards the quality defect of the fluid to be treated, triggering the renewal step. Finally, in one particularly preferred embodiment, the measuring unit 96 also receives the fluid treated by the reactor 20, so that measurements are taken under conditions the closest possible to future conditions of the adsorbent bed.

Evidently, the present invention is not limited to the examples and embodiments described and illustrated, but numerous variants can be made thereto. In particular, in one variant, the measuring method to detect a quality defect of the water is analysis by Fluorescence 3D allowing the in-line monitoring of the quality of water between entering and leaving the adsorbent. This method is particularly adapted to effluents loaded with pollutants or to resources representing algae bloom. Therefore, this method is advantageous for industrial effluents or lixiviates formed by liquid effluents from waste storage. In another variant, the adsorbent is not limited to granular activated carbon but it may also be a resin, clay, zeolite for the capture of metals or other specific micropollutants. These other adsorbents will preferably be of millimetric size.

The adsorbent may also be micro-granular activated carbon i.e. having a finer particle size than granular carbon. For example, the adsorbent can be a microgranular activated carbon of particle size between 300 μm and 800 μm for at least 85 to 90% of the granules, or preferably a particle size of between 400 and 600 μm for at least the majority (50%)

of granules. The indicated sizes are those of the equivalent diameter of the particles for dry screening or for wet screening.

In an additional variant, the proposed method is implemented with an adsorption step directly on raw water, and therefore in particular without prior decanting or floatation. In addition, the proposed method is able to adapt to a wide range of fluid velocities. The fluid velocity is selected for example from among 2 m/h and 20 m/h, preferably between 5 m/h and 20 m/h, more preferably between 10 m/h and 20 m/h or between 5 m/h and 15 m/h. The fluid velocity can notably be chosen as a function of the water temperature.

The invention claimed is:

1. A method for treating fluid, the method comprising an adsorption step of adsorbing pollutants contained in the fluid by an adsorbent bed, and a renewal step to recover adsorption capacities of the adsorbent bed, the renewal step including:

extracting a sample of adsorbent from the adsorbent bed;

determining a target age of a rejuvenated adsorbent sample comprising at least a portion of the sample of adsorbent extracted from the adsorbent bed, at which target age the rejuvenated adsorbent sample achieves a real abatement of pollutants that meets a previously fixed abatement objective; and rejuvenating the adsorbent bed to the determined target age, wherein the rejuvenated adsorbent sample comprises a mixture of at least a portion of the sample of adsorbent and adsorbent of young age.

2. The method according to claim 1, wherein the renewal step is triggered periodically at a previously determined renewal frequency.

3. The method according to claim 1 wherein the renewal step is triggered after a detection step of a quality defect in the fluid downstream of the adsorption step.

4. The method according to claim 3, wherein the detection step of a quality defect is performed when implementing the treatment of the fluid to be treated.

5. The method according to claim 1, wherein the extraction of the sample of adsorbent is carried out at a shutoff phase of the treatment of the fluid to be treated.

6. The method according to claim 1, wherein the extraction of the sample of adsorbent is carried out when implementing the treatment of the fluid to be treated, by sampling at one or more points of the adsorbent bed.

7. The method according to claim 1 wherein, determining the target age of the rejuvenated adsorbent sample comprises measuring the real abatement of pollutants in a sample of fluid treated by the rejuvenated adsorbent sample.

8. The method according to claim 7 wherein:

the rejuvenation of the adsorbent bed to the determined target age is obtained by partial replacement of adsorbent in the adsorbent bed with adsorbent of young age until the determined target age is obtained for the adsorbent bed.

9. The method according to claim 8, wherein determining the target age of the rejuvenated adsorbent sample comprises measuring a real abatement of pollutants in a number of sub-samples of rejuvenated adsorbent obtained by mixing portions of the sample of adsorbent with adsorbent of young age, in varying proportions, the sub-samples of rejuvenated adsorbent having a range of intermediate ages between an age of the sample of adsorbent and an age of the adsorbent of young age, and determining the target age based on the age of a sub-sample of the sub-samples of rejuvenated adsorbent having a real abatement of pollutants that meets the previously set abatement objective.

10. The method according to claim 9, wherein the number of sub-samples of rejuvenated adsorbent is 2 to 10.

11. The method according to claim 8, wherein measuring the real abatement of pollutants in the sub-samples of rejuvenated adsorbent is performed by Short Bed Adsorber measurements on beds of the sub-samples of rejuvenated adsorbent having volumes less than or equal to 100 mL.

12. The method according to claim 1, wherein the real abatement of pollutants is determined for a group of pollutants selected from the group formed by desethylhydroxyatrazine, metaldehyde, aminotriazole, metazachlorine, metazachlorine ESA, metalochlorine, metalochlorine ESA, desethylatrazine, chlortoluron, atrazine, terbuthylazine.

13. The method according to claim 1, wherein the previously fixed abatement objective is a minimum abatement value of the concentration of each pollutant in a group of pollutants.

14. The method according to claim 1, wherein the adsorbent bed comprises granular activated carbon and the adsorption step is performed by passing the fluid to be treated, in the form of an upflow through the adsorbent bed.

15. An installation for treating a fluid, the installation comprising:

a reactor comprising an adsorbent bed configured to adsorb pollutants contained in the fluid to be treated and an orifice for withdrawal, at least partial, of spent adsorbent from the adsorbent bed;

a mixer configured to prepare rejuvenated adsorbent samples each comprising a mixture of spent adsorbent extracted from the adsorbent bed and adsorbent of young age; and a measuring unit configured to measure a real abatement of pollutants by the rejuvenated adsorbent samples.

16. The method according to claim 7, wherein the sample of fluid is taken from the fluid downstream of the adsorption step and doped with pollutants prior passing the sample of fluid through the rejuvenated adsorbent sample to measure the real abatement of pollutants by the rejuvenated adsorbent sample.

17. The installation for treating a fluid according to claim 15, wherein the measuring unit is a Short Bed Adsorber measuring unit configured to measure the real abatement of pollutants by beds of the rejuvenated adsorbent samples each having a volume less than or equal to 100 mL.

18. The method according to claim 8, wherein the adsorbent bed has an age corresponding to a volume of fluid treated by the adsorbent in the adsorbent bed relative to a volume of the adsorbent bed.

19. The method according to claim 18, wherein the target age of the rejuvenated adsorbent sample indicates a volume fraction of the adsorbent in the adsorbent bed that must be replaced by adsorbent of young age for the adsorbent bed to meet the previously fixed abatement objective when implementing the method for treating fluid.

20. The method according to claim 19, wherein the previously fixed abatement objective requires a minimum percentage of each pollutant in a group of pollutants are retained by the adsorbent bed relative to an amount of each pollutant in the group of pollutants entering the adsorbent bed.

\* \* \* \* \*